(12) United States Patent
Choi

(10) Patent No.: US 8,402,688 B2
(45) Date of Patent: Mar. 26, 2013

(54) LURE

(75) Inventor: Eric Eun Ha Choi, Fukuoka (JP)

(73) Assignee: Duel Co., Inc., Fukuoka (JP)

( * ) Notice: Subject to any disclaimer, the term of this patent is extended or adjusted under 35 U.S.C. 154(b) by 5 days.

(21) Appl. No.: 12/679,806

(22) PCT Filed: Sep. 27, 2007

(86) PCT No.: PCT/JP2007/068793
§ 371 (c)(1),
(2), (4) Date: Mar. 24, 2010

(87) PCT Pub. No.: WO2009/040910
PCT Pub. Date: Apr. 2, 2009

(65) Prior Publication Data
US 2010/0205849 A1 Aug. 19, 2010

(51) Int. Cl.
*A01K 85/01* (2006.01)
*A01K 85/00* (2006.01)

(52) U.S. Cl. ............... 43/42.31; 43/42.32; 43/42.33; 43/42.34

(58) Field of Classification Search ........... 43/42.31, 43/42.32, 42.33, 42.34; 40/454, 453
See application file for complete search history.

(56) References Cited

U.S. PATENT DOCUMENTS

| | | | | |
|---|---|---|---|---|
| 644,911 | A | * | 3/1900 | Hedgeland .............. 43/42.32 |
| 1,180,753 | A | * | 4/1916 | Zeigler ................ 43/42.32 |
| 2,088,762 | A | * | 8/1937 | Rous .................... 40/453 |

(Continued)

FOREIGN PATENT DOCUMENTS

| DE | 19907323 A1 * | 8/2000 |
|---|---|---|
| EP | 0947133 A1 | 10/1999 |

(Continued)

OTHER PUBLICATIONS

International Search Report of PCT/JP2007/068793, mailing date of Jan. 15, 2008.

(Continued)

*Primary Examiner* — Darren W Ark
(74) *Attorney, Agent, or Firm* — Westerman, Hattori, Daniels & Adrian, LLP

(57) ABSTRACT

A lure of the present invention comprises a lure body formed as a hollow body by using a transparent material, wherein a plurality of long projections are arranged parallel at predetermined intervals on an inner face of the hollow lure body, a first coloring part is provided on one side face of the long projection, and a second coloring part expressing a color different from the first coloring part is provided on the other side face of the long projection.

In the lure of the present invention, the first and second coloring parts provided on the inner face of the lure body can be seen through via the lure body.

For example, in the case of viewing the lure from one direction, only the color of the first coloring part can be seen through. On the other hand, in the case of viewing the lure from the other direction, only the color of the second coloring part can be seen through.

Since the color of the lure of the present invention can be changed depending on the viewing directions, an excellent fish collecting effect is produced. In addition, the long projections of the lure do not come into contact with a foreign matter at the time of use, so that adhesion of water stain to the first and second coloring parts or peeling off of these coloring parts can be prevented.

1 Claim, 12 Drawing Sheets

U.S. PATENT DOCUMENTS

| | | | | | |
|---|---|---|---|---|---|
| 2,117,206 | A | * | 5/1938 | Neff | 43/42.34 |
| 2,127,761 | A | * | 8/1938 | Beck | 43/42.33 |
| 2,188,753 | A | * | 1/1940 | Jennings | 43/42.33 |
| 2,241,941 | A | * | 5/1941 | Bates | 43/42.33 |
| 2,338,577 | A | * | 1/1944 | Divine | 43/42.34 |
| 2,510,566 | A | * | 6/1950 | Flaherty | 43/42.33 |
| 2,573,592 | A | * | 10/1951 | Nickel | 43/42.33 |
| 2,596,883 | A | * | 5/1952 | Wise | 43/42.33 |
| 2,599,035 | A | * | 6/1952 | Wing | 43/42.33 |
| 2,670,559 | A | * | 3/1954 | Webb et al. | 43/42.33 |
| 2,691,839 | A | * | 10/1954 | Duerig | 43/42.32 |
| 2,764,834 | A | * | 10/1956 | Klein | 43/42.33 |
| 2,851,804 | A | * | 9/1958 | Roach | 40/539 |
| 2,996,826 | A | * | 8/1961 | Lamar | 43/42.32 |
| 3,069,801 | A | * | 12/1962 | Mills | 43/42.33 |
| 3,077,046 | A | * | 2/1963 | Murray | 43/42.33 |
| 3,122,853 | A | * | 3/1964 | Koonz et al. | 43/42.33 |
| 3,133,372 | A | * | 5/1964 | Born | 43/42.34 |
| 3,360,882 | A | * | 1/1968 | Belokin, Jr. | 43/42.33 |
| 3,406,476 | A | * | 10/1968 | Wilcox | 40/453 |
| 3,528,189 | A | * | 9/1970 | Lilley, Jr. | 43/42.33 |
| 3,540,144 | A | * | 11/1970 | Gurka | 43/42.33 |
| 3,575,773 | A | * | 4/1971 | Courtot | 40/453 |
| 3,947,989 | A | * | 4/1976 | Bart | 43/42.33 |
| 4,233,767 | A | * | 11/1980 | Hryhorczuk | 40/453 |
| 4,255,380 | A | * | 3/1981 | Bjorkland | 40/453 |
| 4,266,360 | A | * | 5/1981 | Smith | 43/42.33 |
| 4,536,987 | A | * | 8/1985 | Sanders et al. | 43/42.34 |
| 4,630,389 | A | * | 12/1986 | Higgins | 43/42.33 |
| 4,700,504 | A | * | 10/1987 | Mattison | 43/42.33 |
| 4,747,228 | A | * | 5/1988 | Giovengo, Jr. | 43/42.31 |
| 4,803,793 | A | * | 2/1989 | Schellenberg, III | 43/42.33 |
| 4,862,631 | A | * | 9/1989 | Wilson et al. | 43/42.33 |
| 4,937,960 | A | * | 7/1990 | Otake | 40/453 |
| 5,036,614 | A | | 8/1991 | Jackson | |
| 5,293,709 | A | * | 3/1994 | Cripe | 43/3 |
| 5,465,524 | A | * | 11/1995 | Vallone et al. | 43/42.33 |
| 5,598,650 | A | * | 2/1997 | Brown | 40/453 |
| 5,737,867 | A | * | 4/1998 | Tsutsumi et al. | 43/42.34 |
| 5,737,869 | A | | 4/1998 | Murguido | |
| 6,133,892 | A | * | 10/2000 | Borgwardt | 40/453 |
| 6,202,337 | B1 | * | 3/2001 | Yoshida | 43/42.33 |
| 6,745,395 | B2 | * | 6/2004 | Noble | 40/586 |
| 7,752,801 | B2 | * | 7/2010 | Choi | 43/42.34 |
| 2003/0154642 | A1 | * | 8/2003 | Johnston | 43/42.33 |
| 2003/0182840 | A1 | * | 10/2003 | Colley | 43/3 |
| 2005/0178044 | A1 | * | 8/2005 | Stechschulte | 43/42.32 |
| 2007/0163165 | A1 | * | 7/2007 | Castro et al. | 43/42.34 |
| 2009/0084021 | A1 | * | 4/2009 | Bialobrzeski et al. | 43/42.31 |
| 2010/0107469 | A1 | * | 5/2010 | Dunkerley et al. | 43/42.31 |

FOREIGN PATENT DOCUMENTS

| | | | | |
|---|---|---|---|---|
| JP | 2-105348 | U | | 8/1990 |
| JP | 05137479 | A | * | 6/1993 |
| JP | 09154438 | A | * | 6/1997 |
| JP | 3040825 | U | | 9/1997 |
| JP | 09248100 | A | * | 9/1997 |
| JP | 10-127209 | A | | 5/1998 |
| JP | 10127208 | A | * | 5/1998 |
| JP | 11004639 | A | * | 1/1999 |
| JP | 2000032876 | A | * | 2/2000 |
| JP | 2000041533 | A | * | 2/2000 |
| JP | 2000125700 | A | * | 5/2000 |
| JP | 2000217467 | A | * | 8/2000 |
| JP | 2001103871 | A | * | 4/2001 |
| JP | 2001112378 | A | * | 4/2001 |
| JP | 2002034391 | A | * | 2/2002 |
| JP | 2002095386 | A | * | 4/2002 |
| JP | 2002136248 | A | * | 5/2002 |
| JP | 2002199828 | A | * | 7/2002 |
| JP | 2005192471 | A | * | 7/2005 |
| JP | 2006-55062 | A | | 3/2006 |
| JP | 2006-055062 | A | | 3/2006 |
| JP | 2007312765 | A | * | 12/2007 |

OTHER PUBLICATIONS

Supplementary European Search Report dated Oct. 13, 2011, issued in corresponding European Patent Application No. 07828539.2.

Japanese Office Action dated Oct. 21, 2011, issued in corresponding Japanese Patent Application No. 2009-534098.(w partial English translation).

* cited by examiner

LURE

TECHNICAL FIELD

The present invention relates to a lure used for fishing.

BACKGROUND ART

A lure has a lure body which resembles small fish, shrimps, and the like and a hook attached to the lure body. The lure is a kind of fishing goods coupled to a fishing line and used by being thrown into the sea. When the lure is made swim in the water, target fish shows an interest in the lure, sees the lure as real fish, and preys the lure. The "target fish" in the present description refers to an object to be fished using the lure and includes squid and octopus.

Hitherto, lures painted in various colors are provided to improve predation of target fish with respect to a lure.

For example, an artificial bait (lure) is known in which a plurality of long projections are arranged parallel at predetermined intervals on the outer face of an artificial bait body, a first coloring part is provided on one side face of the long projection, and a second coloring part painted in a color different from that of the first coloring part is provided on the other side face of the long projection (Patent Document 1).

The artificial bait disclosed in Patent Document 1 has the first coloring part on one side face of each of the plurality of long projections formed on the outer face of the artificial bait body and has the second coloring part on the other side face. Consequently, when the artificial bait is seen from one direction, only the color of the first coloring part is seen. On the other hand, when the artificial bait is seen from the other direction, only the color of the second coloring part is seen. Since the color of the artificial bait changes depending on the viewing direction, the predation performance of the target fish is excellent.

[Patent Document 1] Japanese Unexamined Patent Publication No. 2006-55062

SUMMARY OF INVENTION

However, in the conventional artificial bait, the plurality of long projections are arranged parallel at predetermined intervals on the outer face of the artificial bait body, so that it is difficult to remove an attached matter between neighboring long projections. In a state where the attached matter is attached to the long projections, the color painted in the long projections is hidden by the attached matter, so that a sufficient fish collecting effect cannot be achieved. There is also a case that a foreign matter is stuck in neighboring long projections in the conventional artificial bait and cannot be easily detached.

Further, since the conventional artificial bait is provided with first and second coloring parts on the outer face of the artificial bait body, at the time of using the artificial bait, the outer face of the artificial bait touches a rock reef, a dike, or the like. As a result, there is a case that the first and second coloring parts are peeled off.

An object of the present invention is to provide a lure whose color changes depending on a viewing direction, having no possibility that a matter is attached between long projections, and peeling off of a coloring part can be prevented.

The first lure of the present invention comprises a lure body formed as a hollow body by using a transparent material, a plurality of long projections formed so as to be arranged parallel at predetermined intervals on an inner face of the hollow lure body, a first coloring part provided on one side face of the long projection, and a second coloring part expressing a color different from the first coloring part provided on the other side face of the long projection.

Since the first lure has the first and second coloring parts on the inner face of the transparent and hollow lure body, the first and second coloring parts can be seen through from the outer face of the transparent lure body.

The first and second coloring parts are provided on one side face and the other side face, respectively, of each of the plurality of long projections projected from the inner face of the lure body. Consequently, in the case of viewing the lure from one direction, only the color of the first coloring part can be seen through. On the other hand, in the case of viewing the lure from the other direction, only the color of the second coloring part can be seen through.

Therefore, like the conventional artificial bait, the color of the first lure changes depending on a viewing direction, so that target fish predation performance is excellent.

Further, since the long projections are formed on the inner face of the hollow lure body of the first lure, at the time of using the lure, a matter is not attached between a plurality of long projections, and the long projections do not touch a rock reef or the like.

Therefore, the color of the first lure of the present invention changes depending on the viewing direction without maintenance, and the excellent fish collecting effect can be achieved for a long period.

The second lure of the present invention comprises a lure body formed as a hollow body by using a transparent material, a core member housed in a hollow part of the lure body, a plurality of long projections formed so as to be arranged parallel at predetermined intervals on a surface of the core member, a third coloring part provided on one side face of the long projection, and a fourth coloring part expressing a color different from the third coloring part provided on the other side face of the long projection.

In the second lure, since the core member, on which the third and the fourth coloring parts are provided, is housed in the hollow part of the transparent lure body, the third and fourth coloring parts provided on the core member can be seen through from the outer face of the transparent lure body.

The third and fourth coloring parts are provided on one side face and the other side face, respectively, of each of the plurality of long projections projected from the surface of the core member. Consequently, in the case of viewing the lure from one direction, only the color of the third coloring part can be seen through. On the other hand, in the case of viewing the lure from the other direction, only the color of the fourth coloring part can be seen through.

Therefore, like the first lure, the color of the second lure changes depending on a viewing direction, so that target fish predation performance is excellent.

Further, since the long projections are formed on the core member housed in the lure body, at the time of using the lure, a matter is not attached between a plurality of long projections, and the long projections do not touch a rock reef or the like.

Therefore, like the first lure, the color of the second lure of the present invention changes depending on the viewing direction without maintenance, and the excellent fish collecting effect can be achieved for a long period.

DESCRIPTION OF EMBODIMENTS

First Embodiment

Figure 1:
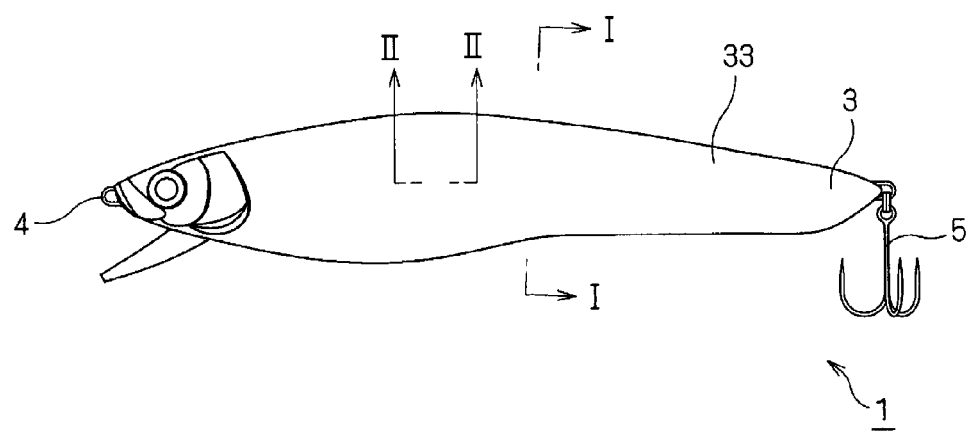
FIG. 1 is a front view of a lure of a first embodiment.
Figure 2:
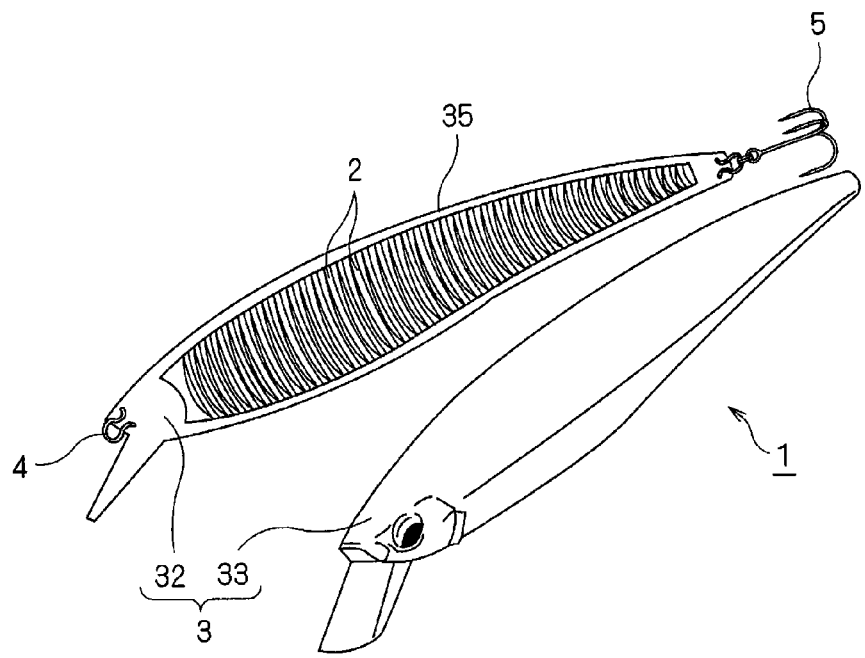
FIG. 2 is a right perspective view showing a state where the lure is disassembled.
Figure 3:
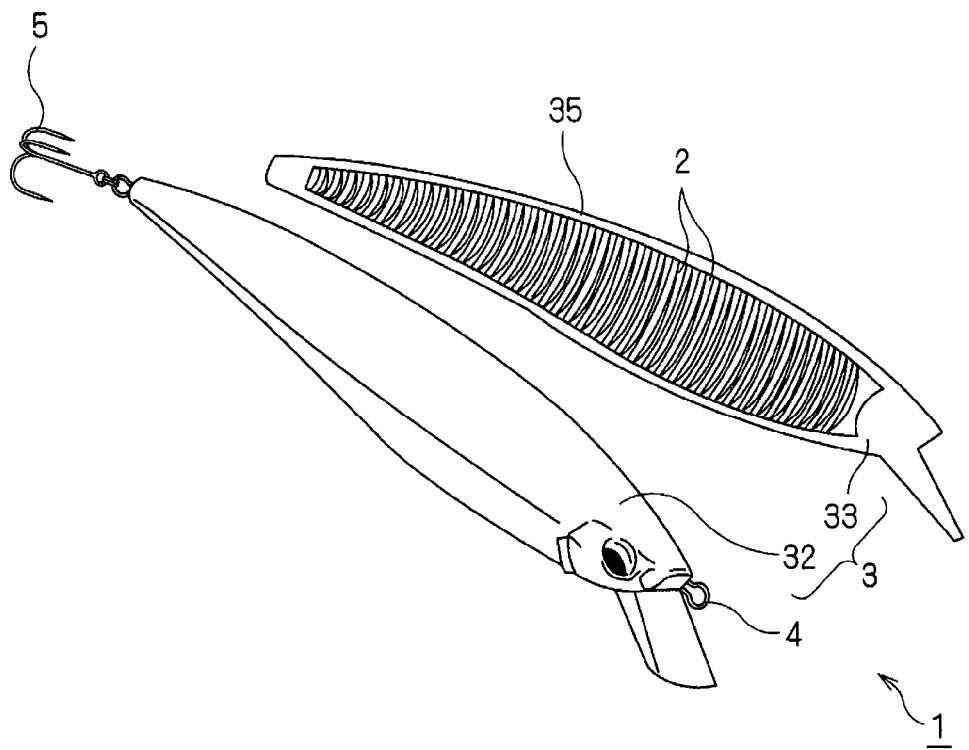
FIG. 3 is a left perspective view showing a state where the lure is disassembled.
Figure 4:
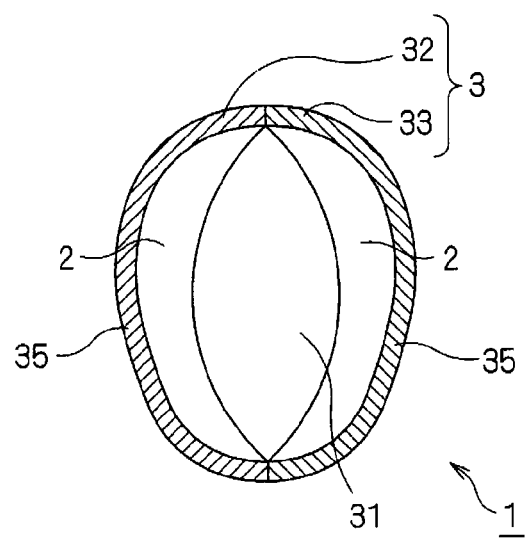
FIG. 4 is an enlarged end view taken along line I-I of FIG. 1 (vertical end view of a part of the lure body).

The present invention will be described below with reference to the drawings.

In FIGS. 1 to 4, numeral 1 denotes a lure. The lure 1 has a hollow lure body 3, a coupling part 4 for coupling a fishing line provided at the front end of the lure body 3, and a hook 5 attached to the lure body 3.

On the inner face of the hollow lure body 3, a plurality of long projections 2 are formed.

The hollow lure body 3 denotes a lure in which a hollow part 31 (cavity part) is formed.

Normally, the hollow lure body 3 is constructed by joining a pair of division members 32 and 33 which are formed from a wall member 35 each having a predetermined thickness. The end faces of the wall member 35 are jointed by using an adhesive or the like.

Concretely, the outer shape of the lure body 3 is formed into a shape resembling small fish.

The lure body 3 is formed by using a transparent material.

The transparent material means a material which transmits light to an extent that a color of the inner face of the lure body 3 can be seen through from the outside of the lure body 3. Therefore, the lure body 3 may be clear and colorless or clear and colored (translucence).

The light transmittance of the lure body 3 is preferably 60% or higher, more preferably, 70% or higher, and particularly preferably, 80% or higher. In the case of the lure body 3 having light transmittance of 60% or higher, the color painted on the inner face can be seen through well from the outside of the lure body 3.

The light transmittance is a value measured by a method conformed to JIS K 7105-1981 (testing methods of optical properties of plastics) and is obtained by "light transmittance (%)=(T2/T1)×100". T2 denotes total light transmittance amount (total amount of light passed through a test piece), and T1 denotes an incident light amount.

The material of the lure body 3 is not particularly limited, but examples of thereof include ABS resin, urethane resin, acrylic resin, an olefinic resin such as polypropylene, a mixture of two or more synthetic resins, and the like.

The pair of division members 32 and 33 is a pair of symmetrical halved molded pieces obtained by dividing the lure body 3 in the transverse direction. The halved molded piece can be obtained by molding a synthetic resin by a known molding method (for example, injection molding).

The thickness of the lure body 3 formed in a hollow state (the minimum thickness of the wall member 35 of the division members 32 and 33) is properly set in consideration of durability of the lure body 3 and is usually about 0.5 mm to 2.0 mm and, preferably, about 0.8 mm to 1.8 mm.

The outer face of the lure body 3 may be formed in a gentle curve shape or a rough shape.

In the case where the outer face of the lure body 3 is formed in a rough shape, the rough shape is not particularly limited. Examples of the rough shape include (1) a scale shape resembling scales of fish, (2) a shape in which a plurality of elongated streaky projections extending in the vertical direction on the outer face of the lure body 3 are arranged parallel in the transverse direction of the lure body 3, and (3) a plurality of elongated streaky projections extending in the transverse direction on the outer face of the lure body 3 are arranged parallel in the vertical direction of the lure body 3.

In the description, the "vertical direction" denotes a direction substantially perpendicular to a virtual line connecting the front end part of the lure body 3 (in the embodiment, the portion in which the coupling part 4 is provided) and the rear end part (in the embodiment, the portion in which the hook 5 is provided). The "transverse direction" is a direction substantially parallel to the virtual line connecting the front and rear end parts of the lure body 3.

The coupling part 4 is provided by fixing a ring member made of a metal or the like to the lure body 3. As the hook 5, for example, a treble hook in which three wires are integrated, or the like can be used. The hook 5 is detachably attached to the ring member fixed to the lure body 3.

The plurality of long projections 2 are formed on the inner face of the lure body 3 formed in a hollow state.

The long projections 2 formed on the inner face of the lure body 3 have a streaky shape that projections protruding to the inside are continued long in the vertical direction of the lure body 3. The plurality of long projections 2 extending in the vertical direction are arranged parallel at predetermined intervals in the transverse direction of the lure body 3.

In the lure 1 of the embodiment, the plurality of long projections 2 are provided substantially entirely in the inner face of the pair of division members 32 and 33.

Figure 5:
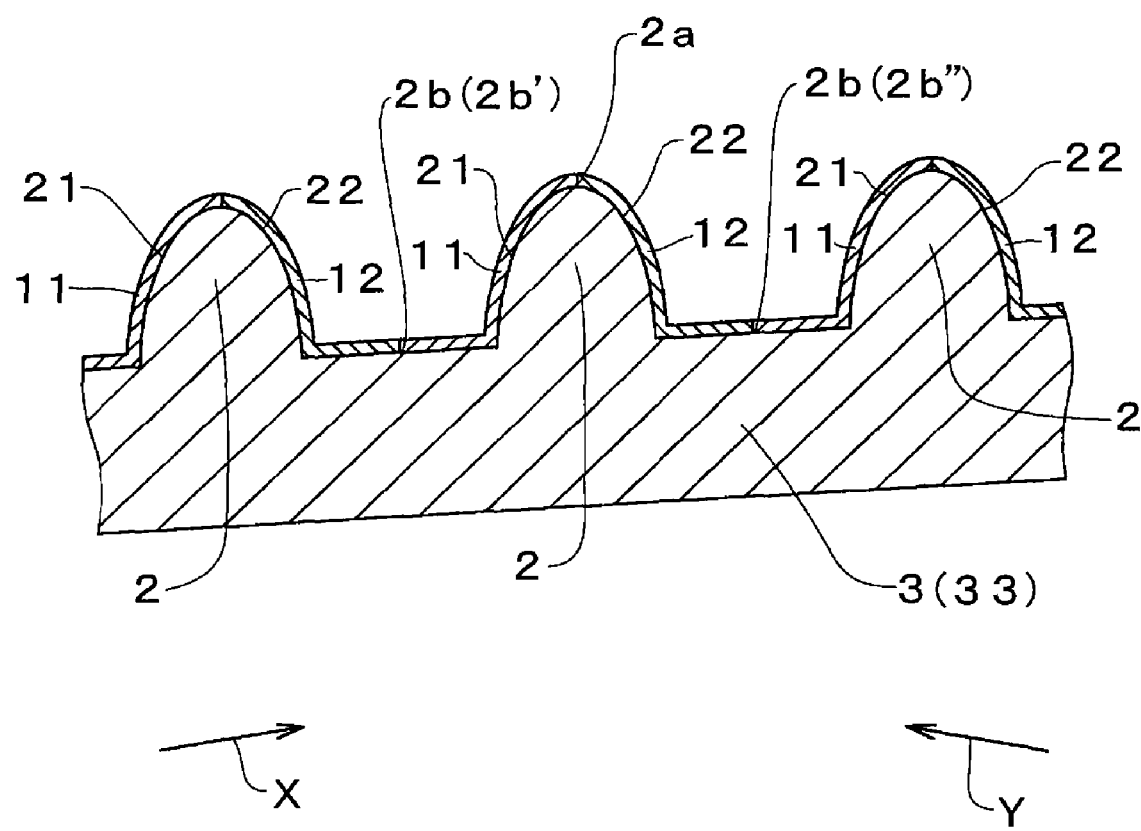
FIG. 5 is an enlarged end view taken along line II-II of FIG. 1 (transverse end view of a part of one of division members of the lure body).

In each of the long projections 2, as shown in FIG. 5, an apex 2a is formed in a circularly-curved substantially-inverted-U-shape in cross section, and a valley 2b which is substantially flat in cross section is formed between neighboring long projections 2.

The formation interval of the long projections 2 is not particularly limited. However, when the formation interval of the long projections 2 is too narrow, it is difficult to color both side faces of the long projections 2. Consequently, the formation interval of the long projections 2 is preferably about 1 mm or more. On the other hand, when the formation interval between the long projections 2 is too wide, a color change does not appear if the outer face of the lure body 3 is not seen from an extreme acute direction. Therefore, the formation interval of the long projections 2 is, preferably, about 5 mm or less and, more preferably, about 2 mm or less.

The projection height (depth) of the long projection 2 is not also particularly limited. However, when the height of the long projection 2 is too low, a color change does not appear if the outer face of the lure body 3 is not seen from an extreme acute direction. Therefore, the projection height of the long projection 2 is, preferably, about 0.5 mm or more and, more preferably, about 1.0 mm or more. On the other hand, when the height of the long projection 2 is too high, it is difficult to color both side faces of the long projections 2. Consequently, the projection height of the long projections 2 is preferably about 5 mm or less and, more preferably, about 3 mm or less.

Figure 6:
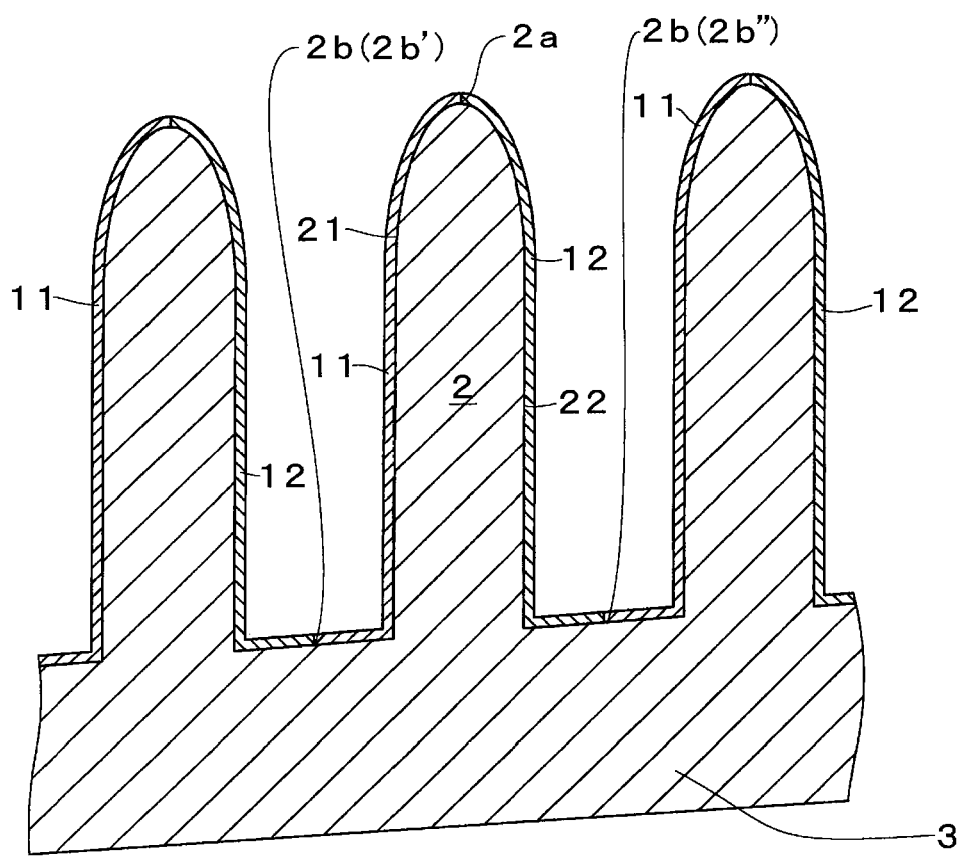
FIG. 6 shows a modification example of the long projections formed on the inner face of the lure body and is an enlarged transverse end view as a cross section of a part of one of the division members of the lure body.

FIG. 6 shows a modification example of the lure body 3 in which the long projections 2 are projected high.

On the surface of each long projection 2, a first coloring part 11 expressing a desired color is provided on a side face 21 as one of side faces using the apex 2a as a boundary, and a second coloring part 12 expressing a color different from that of the first coloring part 11 is provided on the other side face 22 (see FIGS. 5 and 6).

More specifically, the first coloring part 11 is provided in an entire area (one side face 21) from the center of the apex 2a of the long projection 2 to the center of a valley 2b' on one side, and the second coloring part 12 is provided in an entire area (other side face 22) from the center of the apex 2a to the center of a valley 2b" on the other side.

The first and second coloring parts 11 and 12 are not particularly limited as long as they look different from each other (not the same visually). It is sufficient to properly select colors from various colors such as a single color including red, blue, yellow, silver, and the like, a color pattern made of two or more colors, and transparent color. Concretely, for example, red is colored in the first coloring part 11 and a patchy pattern of blue and yellow is colored in the second coloring part 12. For example, it is also possible to select silver color for the first coloring part 11 and select the ground color (including clear and colorless state) of the lure body 3 for the second coloring part 12. In this case, a coloring process is not performed on the formation region of the second coloring part 12, and the ground color of the lure body 3 becomes the second coloring part 12.

The coloring process on the first and second coloring parts 11 and 12 is not particularly limited. For example, methods such as (1) application of an ink of a desired color and (2) adhesion of a sheet (including a film) painted in a desired color or metal foil such as aluminum foil can be mentioned. As the first coloring part 11 or the second coloring part 12, the ground color (clear and colorless, or clear and colored) of the long projections 2 can be used as it is (in this case, the coloring process is not performed.)

As necessary, a coating layer of varnish or the like may be applied on the first and second coloring parts 11 and 12.

The lure 1 having the above-described configuration is used by connecting the coupling part 4 to a fishing line and being thrown into water. When the lure 1 of the present invention is seen from the outer face of the lure body 3, the first and second coloring parts 11 and 12 provided on the inner face can be seen through via the transparent wall member 35 of the lure body 3.

Since the first and second coloring parts 11 and 12 are provided for the long projection 2, for example, when the lure 1 is seen from a direction (front direction) orthogonal to the outer face of the lure body 3, a stripe pattern in which the colors of the first and second coloring parts 11 and 12 alternately appear is seen. As shown in FIG. 5, when the lure 1 is seen from a direction X at an acute angle to the outer face of the lure body 3 (for example, when the lure 1 is seen from a front oblique side to the rear side), the second coloring part 12 hides behind the long projection 2, so that only the color of the first coloring part 11 appears. On the other hand, when the lure 1 is seen from the other direction Y at an acute angle to the outer face of the lure body 3 (for example, when the lure 1 is seen from a rear oblique side to the front side), only the color of the second coloring part 12 appears.

In the lure 1 of the present invention, the long projections 2 are formed on the inner face of the lure body 3 and the first and second coloring parts 11 and 12 are provided for the long projection 2. Consequently, when the lure 1 is made swim by pulling the fishing line, the color of the lure 1 looks changing.

In the lure 1 of the present invention, since the long projections 2 are provided on the inner face of the hollow lure body 3, at the time of using the lure 1, the long projections 2 do not come into contact with a foreign matter.

Therefore, in the lure 1 of the present invention, an attached matter such as water stain does not adhere to a space between the plurality of long projections 2 (for example, the valley 2b between the long projections 2). In addition, the long projections 2 do not hit a rock reef or the like and the first coloring part 11 and/or the second coloring part 12 do/does not come off.

Thus, the lure 1 of the present invention can have an effect that the color changes according to the viewing direction for a long period without performing maintenance such as removal of an attached matter.

In the first embodiment, the plurality of long projections 2 are formed substantially the entire inner face of the lure body 3. However, the present invention is not limited to this configuration. The plurality of long projections 2 may be formed in a part of the inner face of the lure body 3. For example, the plurality of long projections 2 may be formed only in a center region in the transverse direction on the inner face of the lure body 3, or only on the inner face of one of the division members 32 constructing the lure body 3.

Second Embodiment

A lure of a second embodiment is constructed by containing a core member in a hollow part of a hollow lure body.

In the following description of the lure of the second embodiment, there is the case that description of a configuration similar to that of the first embodiment will not be repeated, and the term and reference numerals are used as they are.

Figure 7:
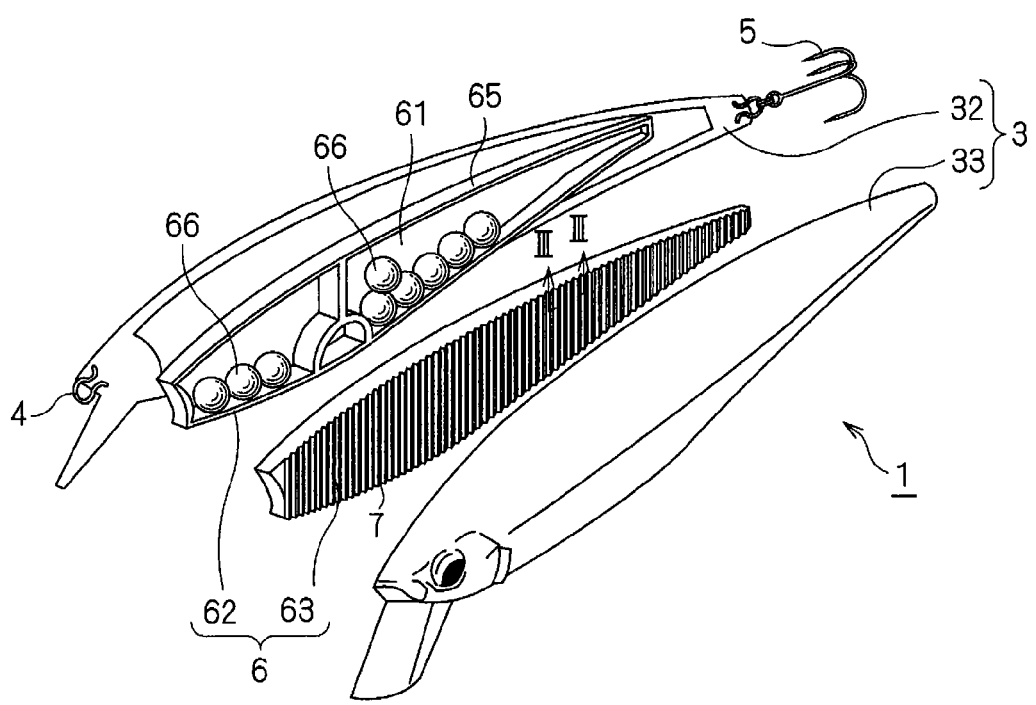
FIG. 7 is a right perspective view of showing a lure of a second embodiment in a state where the lure is disassembled.
Figure 8:
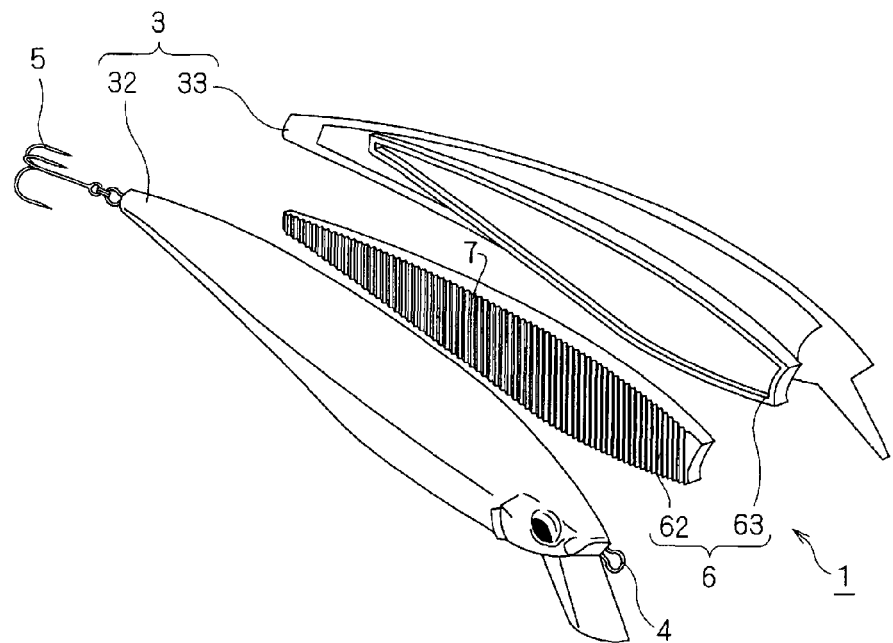
FIG. 8 is a left perspective view showing a state where the lure is disassembled.

In FIGS. 7 and 8, the lure 1 of the second embodiment has the hollow lure body 3 made of a transparent material and a core member 6 housed in the hollow part of the lure body 3.

The lure body 3 is formed in a hollow state by joining a pair of division members 32 and 33 in a manner similar to the first embodiment. The lure body 3 is also provided with the coupling part 4 and the hook 5 in a manner similar to the first embodiment.

The inner face of the hollow lure body 3 is formed in a gentle curve face (no long projections 2 are formed).

The core member 6 is formed in a size that it can be housed in the hollow part 31 of the lure body 3 and is formed in, for example, an elongated shape that the length in the transverse direction is much longer than that in the vertical direction.

The core member 6 is formed in a hollow state, and a plurality of balls 66 are housed in the hollow part 61 of the core member 6. The hollow 61 of the core member 6 is formed in a shape elongated in the transverse direction so that the balls can move in the transverse direction. When the balls 66 move in the hollow 61 of the core member 6, the center of gravity of the lure 1 can be changed in the front/rear direction. When the balls 66 collide the inner face of the core member 6, rattle sound is generated.

The hollow core member 6 is usually constructed by joining a pair of core division members 62 and 63 formed by a wall member 65 having a predetermined thickness. The end faces of the wall member 65 are jointed by using an adhesive or the like.

The core member 6 is fixed in a predetermined position in the hollow part 31 of the lure body 3 by projection/depression engagement, adhesion of an adhesive, or the like. The surface of the core member 6 housed in the lure body 3 may be in contact with the inner face of the lure body 3, or a gap may be provided between the core member 6 and the inner face of the lure body 3.

On both side faces (the surfaces of the pair of core division members 62 and 63) of the core member 6, like the long projections shown in the first embodiment, long projections 7 are protruded (hereinafter, to distinguish them from the long projections 2 formed in the lure body 3, the long projections 7 formed in the core member 6 will be called "core long projections").

The core long projections 7 are formed on a side face of the core member 6 and have a streaky shape that projections protruding to the outside are continued long in the vertical direction of the lure body 3. The plurality of core long projections 7 extending in the vertical direction are formed on the side face of the core member 6 and arranged parallel at predetermined intervals in the transverse direction of the lure body 3.

Figure 9:
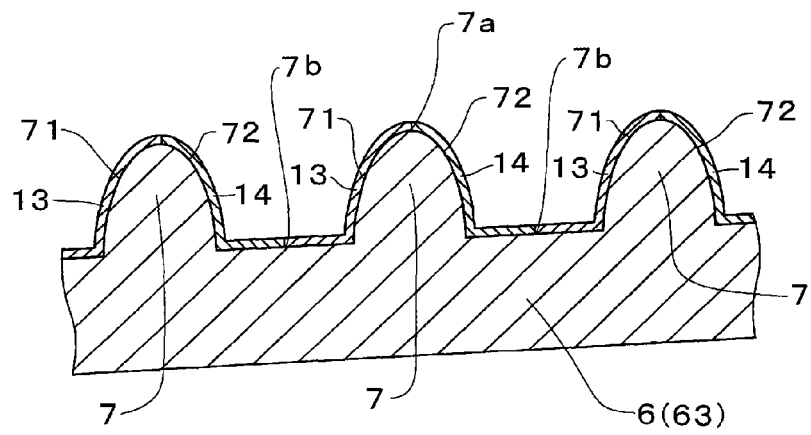
FIG. 9 is an enlarged end view taken along line III-III of FIG. 7 (transverse end view of a part of one of core division members of the core member).

In each of the core long projections 7, as shown in FIG. 9, an apex 7a is formed in a circularly-curved substantially-inverted-U-shape in cross section, and a valley 7b which is substantially flat in cross section is formed between neighboring core long projections 7.

The formation interval and protrusion height of the core long projections 7 are similar to those of the long projections 2 in the first embodiment.

On the surface of each core long projection 7, as shown in FIG. 9, a third coloring part 13 expressing a desired color is provided on a side face 71 as one of side faces using the apex 7a as a boundary, and a fourth coloring part 14 expressing a color different from that of the third coloring part 13 is provided on the other side face 72.

The colors, coloring methods and the like of the third and fourth coloring parts 13 and 14 can be properly set in a manner similar to those of the first and second coloring parts 11 and 12 of the first embodiment.

When the lure of the second embodiment is seen from the outer face of the lure body 3, the third and fourth coloring parts 13 and 14 provided for the core member 6 can be seen through via the transparent lure body 3.

Since the third and fourth coloring parts 13 and 14 are provided for the core long projection 7, in a manner similar to the above embodiment, when the lure 1 is seen from a front direction, a stripe pattern in which the colors of the third and fourth coloring parts 13 and 14 alternately appear is seen. When the lure 1 is seen from one direction, the fourth coloring part 14 hides behind the core long projection 7, so that only the color of the third coloring part 13 appears. On the other hand, when the lure 1 is seen from the other direction, only the color of the fourth coloring part 14 appears.

The color of the lure 1 of the second embodiment also looks changing according to the viewing direction like the lure 1 of the first embodiment.

Since the core member 6 is housed in the hollow part 31 of the lure body 3, at the time of using the lure 1, the core long projections 7 do not come into contact with a foreign matter. The lure 1 of the second embodiment can achieve an effect that the color changes according to the viewing direction for a long period without maintenance.

Next, a modification example of the second embodiment will be described.

In the core member 6 shown in the second embodiment, the plurality of movable balls 66 are housed in the hollow part 61. However, only one ball 66 may be housed therein.

In place of the balls, a spindle having an arbitrary shape may be fixedly housed in the hollow part 61 of the core member 6.

Figure 10:
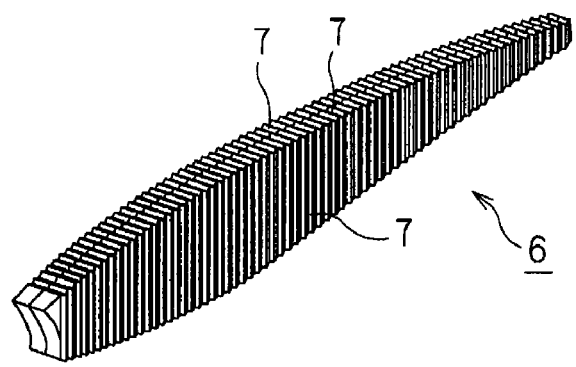
FIG. 10 is a right perspective view showing a modification example of a core member.

Further, although the core long projections 7 are provided on both side faces of the core member 6 shown in the second embodiment, the core long projections 7 may be provided on the top face (and/or the under face) of the core member 6 as shown in FIG. 10. In this case, preferably, the third and fourth coloring parts 13 and 14 are provided on both side faces of the core long projection 7 provided on the top face (and/or the under face) of the core member 6 as described above.

Figure 11:
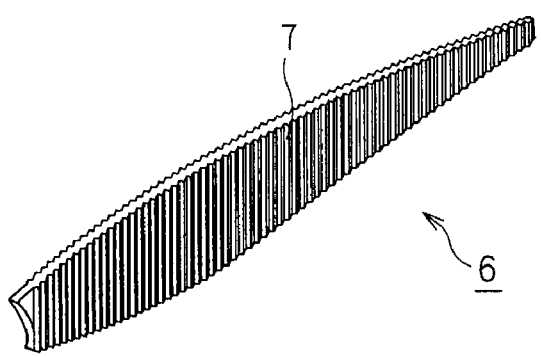
FIG. 11 is a right perspective view showing another modification example of a core member.

Further, the core member 6 is not limited to the hollow but may be a solid. In this case, the core member 6 is formed, for example, in a plate shape as shown in FIG. 11, and the core long projections 7 are provided on both side faces of the plate-shaped core member 6.

Figure 12:
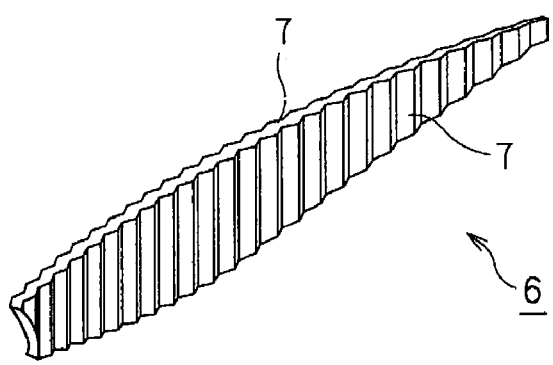
FIG. 12 is a right perspective view showing another modification example of a core member.

In the case of constructing the core member 6 by a plate member, as shown in FIG. 12, the core member 6 may be formed in a corrugated plate shape. In the core member 6 formed in the corrugated plate shape, mountain and valley parts in waves are alternately formed on both side faces, and the mountain parts of the waves correspond to the core long projections 7. As the core member 6 in the corrugated plate shape, a resin mold may be used, or a corrugated sheet formed in the corrugated shape obtained by pressing a mold against a sheet may be used.

In the second embodiment, the plurality of core long projections 7 are formed substantially entirely on both side faces of the core member 6. However, the present invention is not limited to the above. The plurality of core long projections 7 may be formed in a part of the side face of the core member 6. For example, the plurality of core long projections 7 may be formed only in a center region on each of both side faces of the core member 6, or may be formed only on one of the division members 62 of the core member 6.

Figure 13:
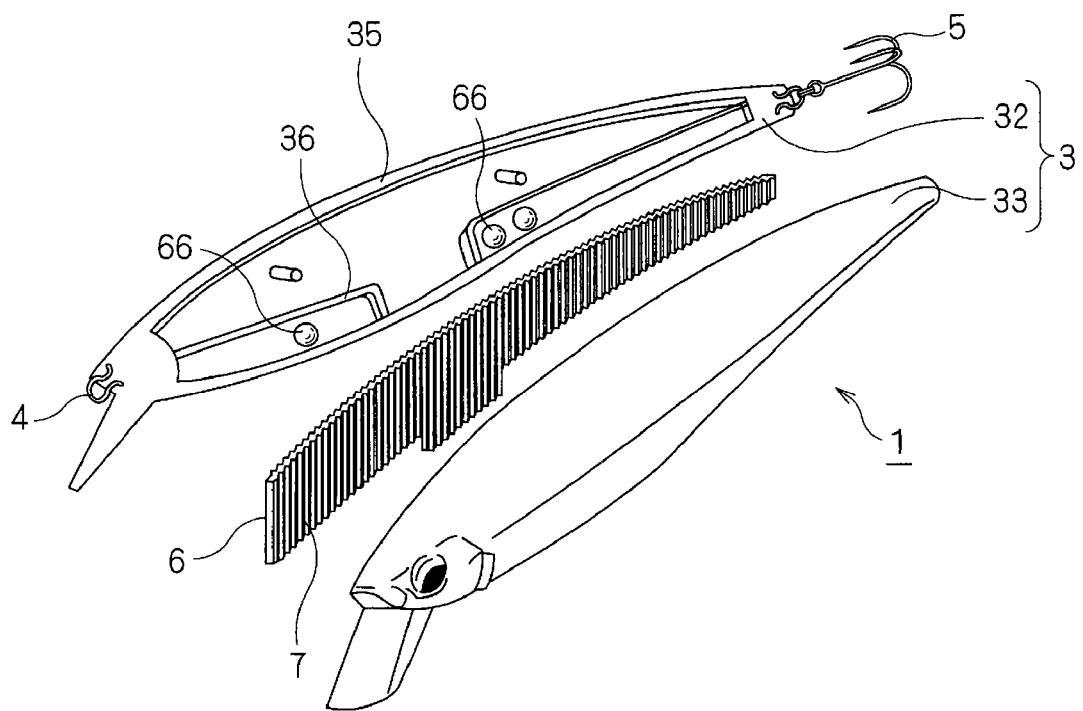
FIG. 13 is a right perspective view of showing a modification example of a lure of a second embodiment in a state where the lure is disassembled.

Further, although the balls 66 are housed in the core member 6 in the second embodiment, for example, as shown in FIG. 13, the balls 66 may be housed movably in the hollow part 31 of the lure body 3. In this case, to assure movement space of the balls 66 in the hollow part 31 of the lure body 3, a partition wall 36 is formed in the hollow part 31. A part of the core member 6 housed in the hollow part 31 of the lure body 3 is cut so as to avoid the movement space of the balls 66.

In the second embodiment, the long projections 2 are not provided on the inner face of the lure body 3. However, it is also possible to form the long projections 2 having the first and second coloring parts 11 and 12 on the inner face of the lure body 3 in a manner similar to the first embodiment, and house the core member 6 in the hollow part 31 of the lure body 3.

Third Embodiment

A third embodiment is a modification example common to the lures of the first and second embodiments.

In the lure 1 of the first embodiment, the long projections 2 are formed so as to extend in the vertical direction. However, for example, the long projections 2 may be formed so as to extend in the transverse direction. The plurality of long projections 2 extending in the transverse direction are arranged parallel in the vertical direction of the lure body 3. The long projections 2 may be formed so as to extend in an oblique direction.

Similarly, the core long projections 7 of the second embodiment are not limited to the case where they are formed so as to extend in the vertical direction. The core long projections 7 may be formed so as to extend in the transverse or oblique direction.

Further, the long projections 2 in the first embodiment and the core long projections 7 in the second embodiment are formed so as to extend linearly. However, they may be formed so as to extend non-linearly like substantially circularly, in a substantially dog-leg shape, in a substantially zigzag shape, or the like.

Figure 14:
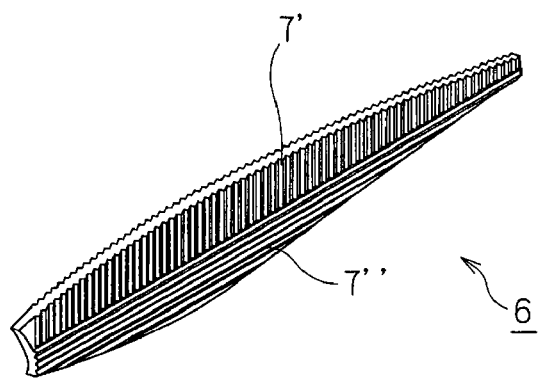
FIG. 14 is a right perspective view showing a modification example of core long projections formed on the surface of a core member.

Further, for example, as shown in FIG. 14, a plurality of core long projections 7' extending in the vertical direction and a plurality of core long projections 7" extending in the transverse direction may be formed on a side face of the core member 6. Similarly, a plurality of long projections extending in the vertical direction and a plurality of long projections extending in the transverse direction may be formed on the inner face of the lure body 3 (not shown).

In the long projection 2 in the first embodiment, the apex 2a is formed in a substantially circular shape in cross section and the valley 2b having a substantially flat shape in cross section is formed between neighboring long projections 2. However, the long projection 2 is not limited to the shape but can be changed in various shapes.

Figure 15:
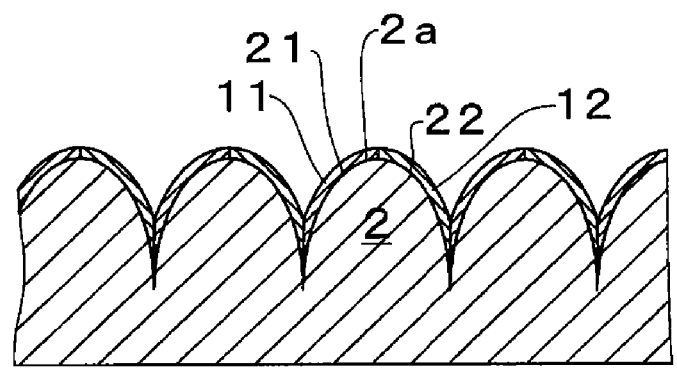
FIG. 15 shows a modification example of long projections formed on the inner face of a lure body and is an enlarged transverse end view as a cross section of a part of one of the division members of the lure body.
Figure 16:
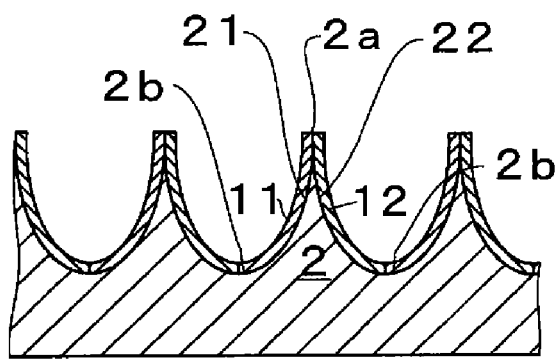
FIG. 16 is an enlarged end view showing another modification example of long projections formed on the inner face of the lure body.
Figure 17:
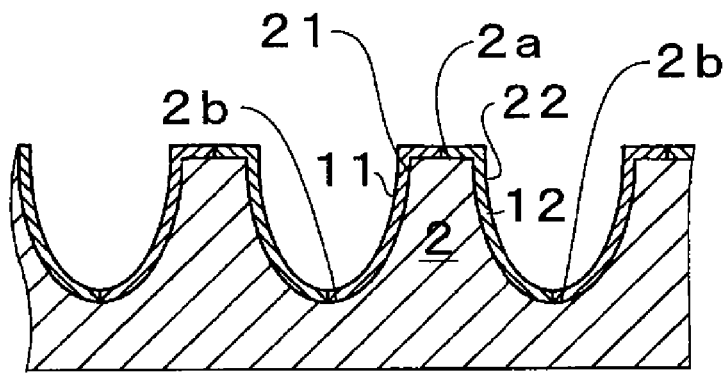
FIG. 17 is an enlarged end view showing another modification example of long projections formed on the inner face of the lure body.
Figure 18:
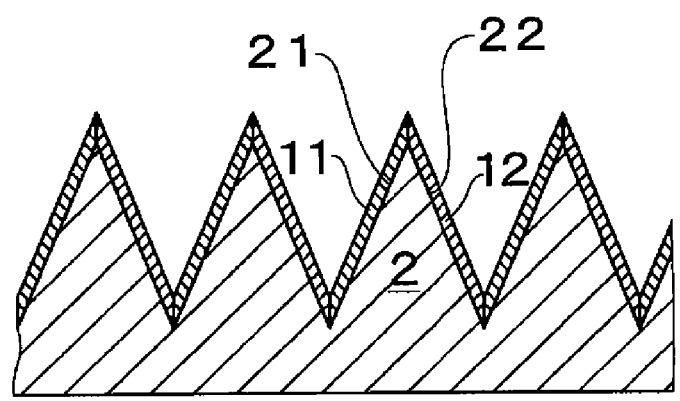
FIG. 18 is an enlarged end view showing another modification example of long projections formed on the inner face of the lure body.

For example, the present invention may employ a form in which the portions from the apex 2a to both side faces 21 and 22 of each long projection 2 are formed circularly and the long projections 2 are densely arranged in parallel as shown in FIG. 15, a form in which the apex 2a of each long projection 2 is formed in a pointed shape in cross section and the valley 2b having a substantially circular shape in cross section is formed between neighboring long projections 2 as shown in FIG. 16, a form in which the apex 2a of each long projection 2 is formed in a substantially flat shape in cross section and the valley 2b having a substantially circular shape in cross section is formed between neighboring long projections 2 as shown in FIG. 17, and a form in which the long projection 2 is formed in a substantially triangle shape in cross section as shown in FIG. 18. In any of the long projections 2 having the shapes, the first coloring part 11 is provided on one side face 21 of the long projection 2, and the second coloring part 12 is provided on the other side face 22.

The shape of each core long projection 7 of the second embodiment can be also changed to various forms like the modification examples (FIGS. 15 to 18 and the like) of the long projection 2.

Figure 19:
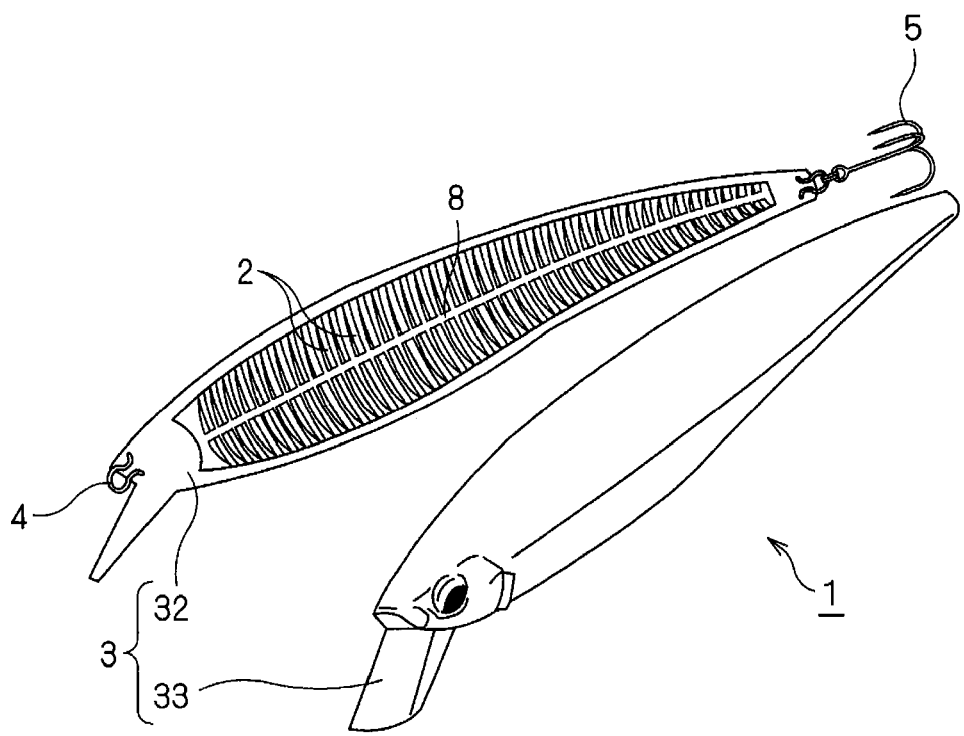
FIG. 19 shows another modification example of the long projections formed on the inner face of the lure body and is a right perspective view showing a state where the lure is disassembled.

Further, on the inner face of the lure body 3 of the first embodiment, as shown in FIG. 19, a long groove 8 dividing all of the long projections 2 may be formed. The long groove 8 may be formed so as to divide the long projections 2 as a part of the plurality of long projections 2. The long groove 8 is formed, preferably, in a direction orthogonal to the extension direction of the long grooves 2 (in FIG. 19, the long projections 2 are formed so as to extend in the vertical direction, so that the long groove 8 extends in the transverse direction).

One long groove 8 may be provided, or two or more long grooves 8 may be arranged in parallel.

Also in the surface of the core member 6 of the second embodiment, in a manner similar to the modification example, a long groove dividing the core long projections 7 (all of the core long projections 7 or core long projections as a part of the plurality of core long projections 7) may be formed (not shown).

Figure 20:
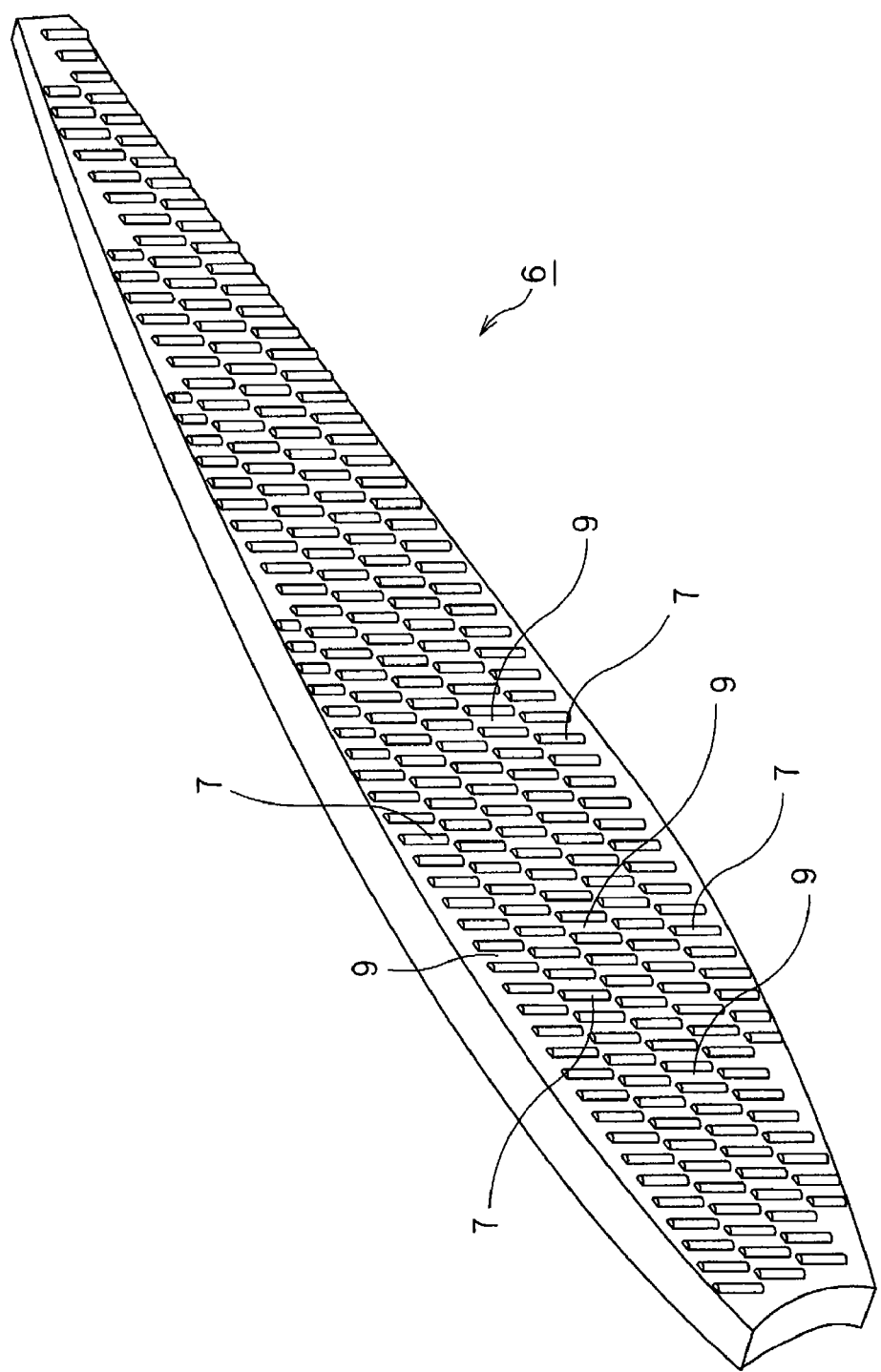
FIG. 20 is a right perspective view showing another modification example of core long projections formed on the surface of a core member.

As a modification example of the second embodiment, as shown in FIG. 20, the core long projections 7 may be disposed in a staggering manner (zigzag manner).

Concretely, the core long projections 7 are formed so as to extend in the vertical direction. However, in the vertical direction, the core long projections 7 and non-projection parts 9 are formed alternately at predetermined intervals. The non-projection part 9 is constructed by a surface portion of the core member 6 and is lower than the core long projection 7.

A plurality of sequences in each of which the core long projections 7 and the non-projection parts 9 are alternately arranged in the vertical direction are formed at predetermined intervals in the transverse direction. The core long projections 7 in odd-numbered sequences are disposed between the non-projection parts 9 in the neighboring even-numbered sequences (that is, the core long projections 7 are disposed in a zigzag manner).

In a manner similar to the second embodiment, the third and fourth coloring parts 13 and 14 are provided on one side face and the other side face of each core long projection 7.

In the lure 1 of the modification example, in a manner similar to the first embodiment, the color of the third coloring part 13 or the fourth coloring part 14 provided for the core long projection 7 can be seen through by changing the viewing direction. Since the core long projections 7 in the sequences are independent of each other and are formed in a zigzag manner, they look like fish scales.

Therefore, the lure 1 of the modification example has an appearance closer to real small fish.

Also on the inner face of the lure body 3 of the first embodiment, in a manner similar to the modification example, the long projections 2 and the non-projection parts may be alternately formed in the vertical direction, and the alternate sequences may be provided at predetermined intervals in the transverse direction (that is, the long projections 2 may be disposed in a zigzag manner on the inner face of the lure body 3 of the first embodiment).

What is claimed is:
1. A lure comprising:
    a transparent hollow lure body;
    a core member housed in a hollow part of the lure body;

a plurality of long projections formed on a surface of the core member that are arranged essentially parallel to one another at predetermined intervals and wherein each of the long projections comprises one side face and an opposite side face, and a length of each of the projections extends transverse to a length of the core, wherein a first coloring part is provided on said one side face of each of the long projections, a second coloring part is provided on said opposite side face of each of the long projections, and the first coloring part is a different color than the second coloring part, wherein the core member is formed as a hollow body, and a ball is movably housed in a hollow part of the core member.

* * * * *